(12) United States Patent
Pelagatti

(10) Patent No.: US 8,464,857 B2
(45) Date of Patent: Jun. 18, 2013

(54) DEVICE FOR THE TREATMENT OF ARTICLE FLOWS AND METHOD THEREFOR

(71) Applicant: Pietro Pelagatti, Sambuceto di San Giovanni Teatino (IT)

(72) Inventor: Pietro Pelagatti, Sambuceto di San Giovanni Teatino (IT)

(73) Assignee: Fameccanica.Data S.p.A., Sambuceto di San Giovanni Teatino (IT)

( * ) Notice: Subject to any disclaimer, the term of this patent is extended or adjusted under 35 U.S.C. 154(b) by 0 days.

(21) Appl. No.: 13/647,476

(22) Filed: Oct. 9, 2012

(65) Prior Publication Data

US 2013/0032451 A1    Feb. 7, 2013

Related U.S. Application Data

(63) Continuation of application No. 12/993,021, filed as application No. PCT/IB2009/052000 on May 14, 2009, now Pat. No. 8,307,973.

(30) Foreign Application Priority Data

May 21, 2008    (IT) .......................... WO2008A000378

(51) Int. Cl.
 *B65G 47/26*    (2006.01)
(52) U.S. Cl.
 USPC ...................................... 198/459.3; 198/625
(58) Field of Classification Search
 USPC .................... 198/459.3, 608, 625, 611, 459.4
 See application file for complete search history.

(56) References Cited

U.S. PATENT DOCUMENTS

| | | | |
|---|---|---|---|
| 2,886,200 A | 5/1959 | Thulke et al. | |
| 3,036,624 A | 5/1962 | Carter | |
| 3,122,230 A | 2/1964 | Bogue | |
| 3,342,117 A * | 9/1967 | Cole | 198/611 |
| 3,415,351 A * | 12/1968 | Ware et al. | 198/374 |
| 3,791,508 A * | 2/1974 | Osborne et al. | 198/625 |

(Continued)

FOREIGN PATENT DOCUMENTS

| | | |
|---|---|---|
| DE | 102005046508 A1 | 4/2007 |
| EP | 0 943 562 A1 | 9/1999 |

(Continued)

OTHER PUBLICATIONS

Abstract for DE 10 2005 046 508 A1 (1 page).

(Continued)

*Primary Examiner* — James R Bidwell
(74) *Attorney, Agent, or Firm* — Popovich, Wiles & O'Connell, P.A.

(57) ABSTRACT

A device 10 for generating an output flow of articles, starting from a flow of incoming articles having a given advancing velocity, includes a screw conveyor to receive longitudinally the flow of incoming articles. The conveyor in question comprises at least one screw the helix of which is susceptible to interact with the advancing of articles to determine their conveying by the screw itself. The rotational velocity of the screw is adjustable for varying the conveying velocity of the articles with respect to the initial advancing velocity. In particular, it is possible to act so that the conveying velocity of the articles by the screw is a sub-multiple of the initial advancing velocity so that the output flow of articles includes groups of stacked articles. Each group includes a number of articles equal to the ratio between the initial advancing velocity and the conveying velocity of the screw.

23 Claims, 3 Drawing Sheets

U.S. PATENT DOCUMENTS

Figure 1:
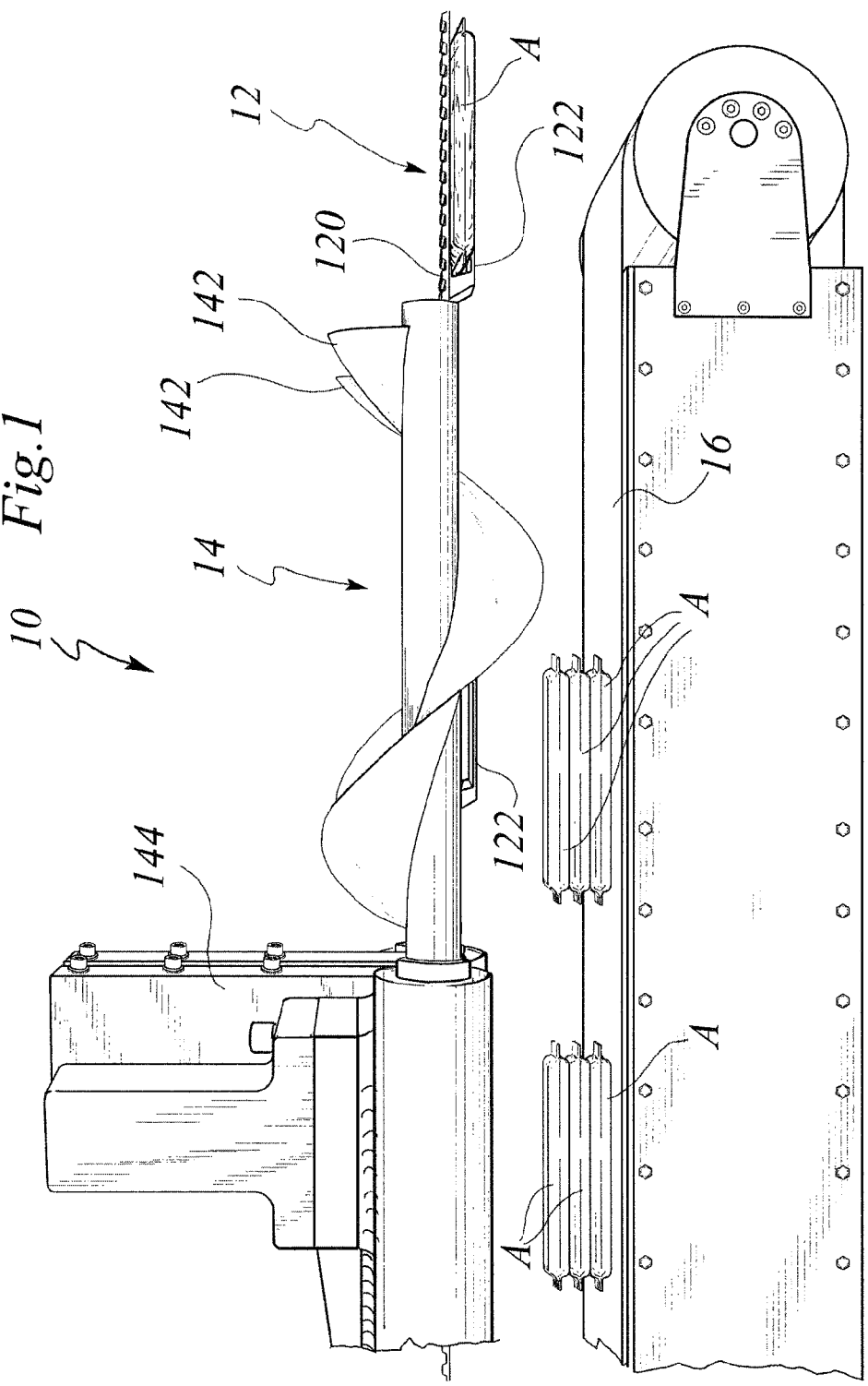

| | | | | |
|---|---|---|---|---|
| 4,875,309 A | * | 10/1989 | Long, III | 198/625 |
| 5,050,725 A | | 9/1991 | Newell et al. | |
| 5,310,043 A | | 5/1994 | Alcorn | |
| 8,307,973 B2 | * | 11/2012 | Pelagatti | 198/459.3 |

FOREIGN PATENT DOCUMENTS

| | | |
|---|---|---|
| JP | H 2-4816 U | 1/1990 |
| JP | H 7-157056 A | 6/1995 |
| JP | 2003-12142 A | 1/2003 |
| WO | WO 02/079064 A1 | 10/2002 |

OTHER PUBLICATIONS

Aug. 7, 2009 International Search Report and Written Opinion in PCT Application No. PCT/IB2009/052000 (13 pages).
Abstract for JP 2003-12142 A (2 pages).
English translation of JPH 7-157056 A (5 pages).
English translation of the Feb. 5, 2013 Office Action issued in Japanese Patent Application No. 2011-510074 (3 pages).

* cited by examiner

DEVICE FOR THE TREATMENT OF ARTICLE FLOWS AND METHOD THEREFOR

This application is a continuation of U.S. patent application Ser. No. 12/993,021, filed Nov. 16, 2010, now U.S. Pat. No. 8,307,973 B2, issued Nov. 13, 2012, which is the National Stage Entry of PCT Application No. PCT/IB09/52000, filed May 14, 2009, the contents of each of which are hereby incorporated by reference herein.

FIELD OF THE INVENTION

The invention refers to techniques for the handling of article flows.

The invention was developed with particular attention to possible employment in the field of machines for the automatic treatment (for example, for the packaging) of articles such as sanitary hygienic articles (diapers, hygienic absorbent pads, etc.).

However, reference to this possible field of application should not be interpreted as limiting of the scope of the invention.

DESCRIPTION OF THE RELATED ART

In the treatment of flows of advancing articles (for example, in the field of machines for the production and packaging of hygienic-sanitary articles) the need often arises to selectively vary the separation distance (or pitch) between subsequent articles in a flow and/or the need to obtain an exiting flow constituted of groups of stacked articles, starting from a flow of single entering articles.

The formation of such groups of stacked articles can be assigned to devices currently denominated "grouping devices". An example of a grouping device is described in the document EP-A-O 943 562, assigned to the present Applicant.

Such devices are often called on to operate on rather intense input article flows (with intensities in the order of 1,000 articles/minute or higher), and the number of articles comprised in each group identifies the functioning velocity of the grouping device. For example, a grouping device operating on an input flow of 1,000/minute and destined to form groups of 10 articles each must be able to operate at a grouping velocity equal to 100 groups/minute. In the language of the field, the single group is called a stack, and in the specific case considered the grouping device is capable of 100 stacks/minute each stack composed of 10 pieces. However, in a number of applications, the need arises to form groups of articles containing a reduced number of articles, for example, two or three articles. Under such conditions, the nominal functioning velocity imposed on the grouping device can become too high. For example, grouping devices with the highest performances currently available on the market provide performances of 100-200 stacks/minute. Equipment is also known that can produce 200 packages/minute: one such equipment, combined with a 2000 piece/minute machine is therefore capable of forming stacks of 10 pieces.

When the nominal functioning velocity imposed on the grouping device becomes too high and, in fact, is not attainable, one may be forced to:

reduce the intensity of the input flow, for example operating a unit capable of producing 1,000 articles/minute at a reduced velocity, in the order of 200-300 articles/minute; or divide the input flow of articles into several sub flows (for example, three-four sub flows, each with an intensity reduced to one third or one quarter of the original flow) adapted to be treated in an suitable way by as many grouping devices.

The first solution results in an obvious inefficiency from the point of view of productivity, while the second solution translates into a notable burden in terms of complexity (and cost) of the machine; this factor is even more negative when the need to form groups with a reduced number of articles is only temporary.

OBJECT AND SUMMARY OF THE INVENTION

In this general context, the need is felt for grouping devices available capable of forming groups of articles, such as sanitary articles (for example, single use absorbent pad products) even containing a reduced number of single articles (two or three) operating with cadences completely compatible with the elevated cadences (1,000/minute and more) found in treatment stations upstream.

According to the present invention, such object is achieved by means of a device having the characteristics specifically recalled in the claims that follow. The invention also refers to a corresponding method.

The claims form an integral part of the technical disclosure provided herein relative to the invention.

In one embodiment, the invention is suitable for realizing a grouping device capable of operating, in a completely consistent and reliable way, at elevated functioning velocities that are completely compatible with the current functioning cadences of the production and work stations susceptible of being upstream.

In one embodiment, the device described herein is capable of simply performing the function of varying the separation step of the articles in a flow, without providing any actually grouping of them.

BRIEF DESCRIPTION OF THE ANNEXED DRAWINGS

Figure 2:
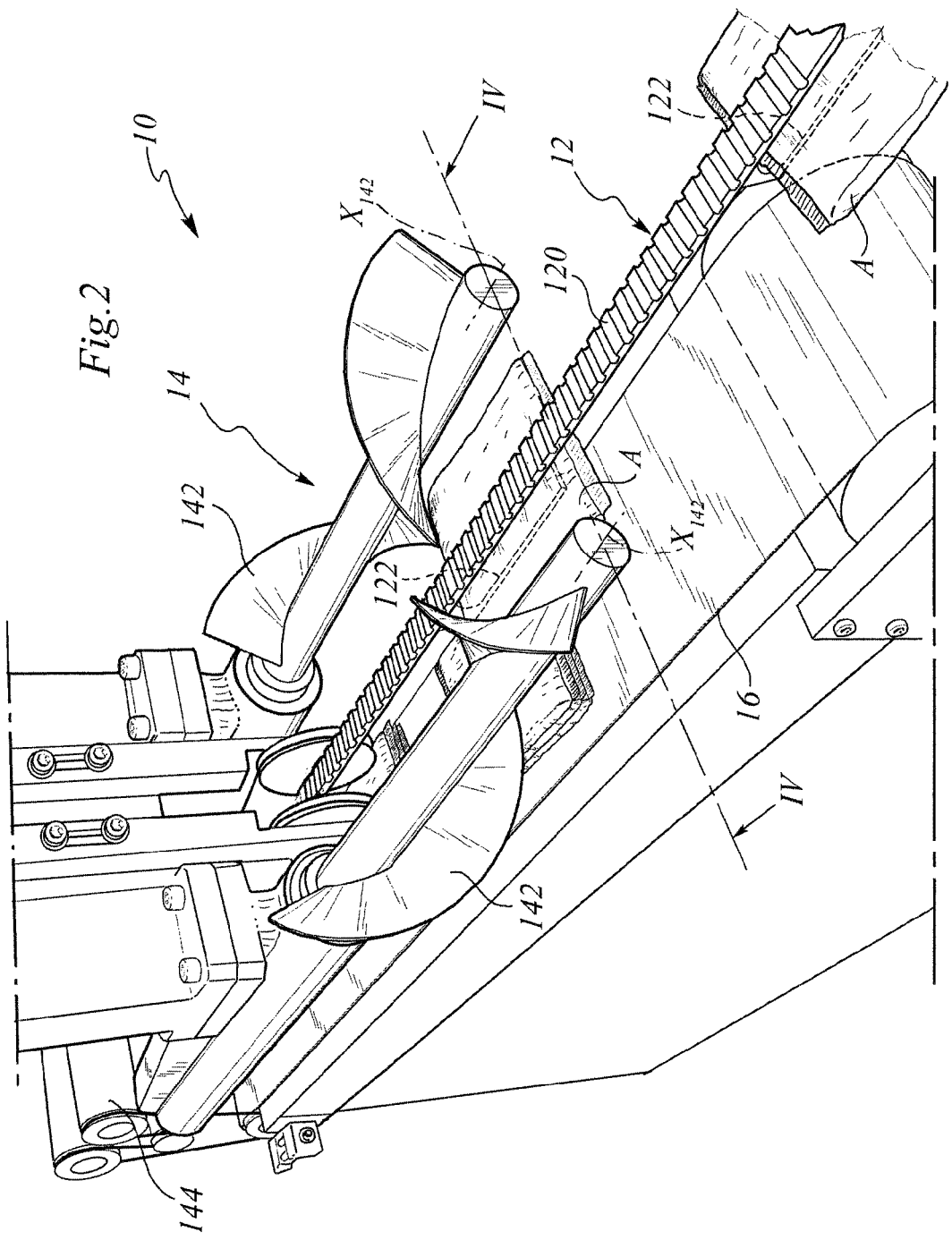
Figure 3:
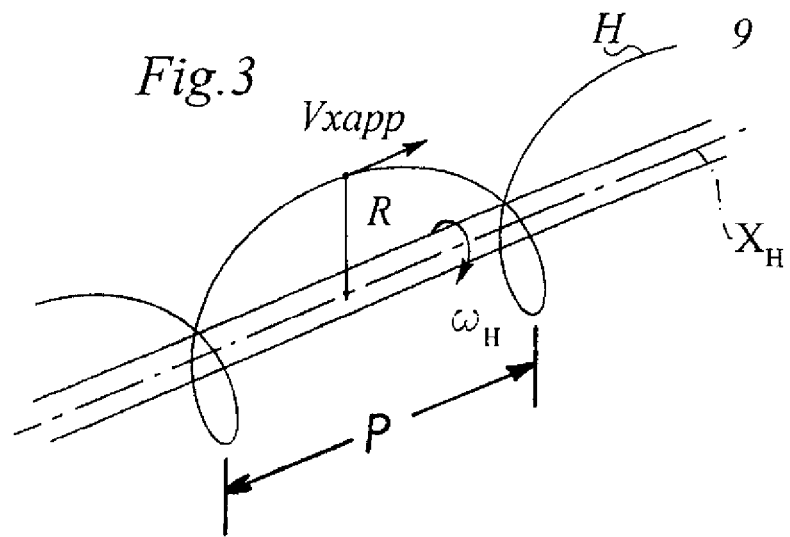
Figure 4:
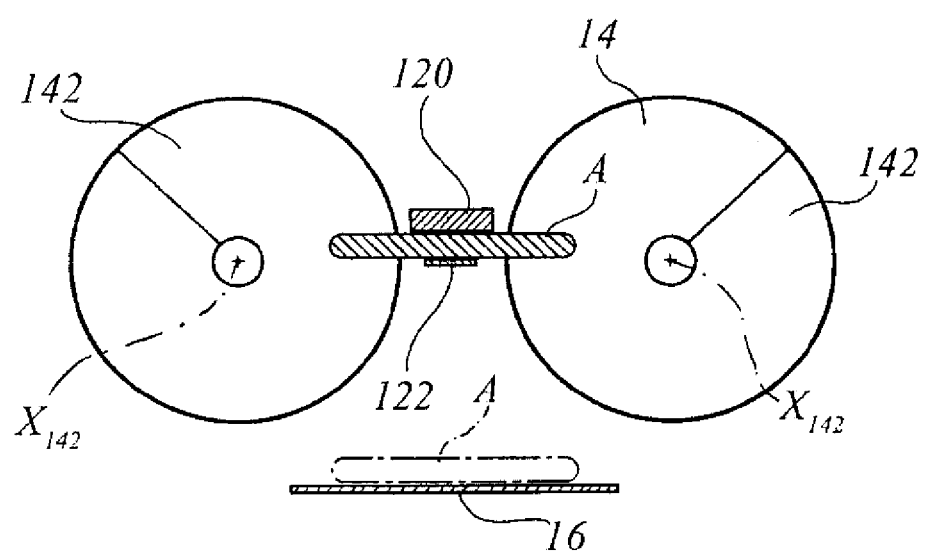

The invention will now be described, by way of non-limiting example only, with reference to the annexed drawings, wherein:

FIG. 1 is a lateral elevation view of a device of the type described herein, FIG. 2 is a prospective view from above of the same device, FIG. 3 is a schematic geometric representation useful to better understand the functioning principle of the device described herein, and FIG. 4 is a frontal elevation view approximately along the line IV-IV in FIG. 2.

DETAILED DESCRIPTION OF THE EMBODIMENTS

In the description that follows various specific details aimed at a thorough understanding of the embodiments are illustrated. The embodiments can be practiced without one or more of the specific details, or with other methods, components, materials, etc. In other cases, known structures, materials or operations are not shown or described in detail to avoid obscuring the various aspects of the embodiments.

Reference throughout this description to "an embodiment" or "one embodiment" indicates that a particular feature, structure or characteristic described relative to the embodiment is present in at least one embodiment. Therefore, phrases like "in an embodiment" or "in one embodiment", possibly present in various places in this description are not necessarily referring to the same embodiment. Furthermore, particular features, structures or characteristics may be combined in any suitable way in one or more embodiments.

The headings used herein are for convenience only and thus do not define the field of protection or the scope of the embodiments.

In FIG. 1 a device for the treatment of articles, such as, for example hygienic sanitary articles A, is indicated in its entirety with 10. In the example illustrated herein, the articles in question indicated with A, are feminine hygienic absorbent pads of the three-fold type with each article received inside a type of package currently denominated "flow-pack". Naturally, the solution described herein is susceptible of being applied to completely different articles, such as—for example—a bi-folded baby diaper.

The device 10 illustrated herein comprises three conveyors indicated with 12, 14 and 16, respectively, destined to operate in a cascaded arrangement.

The conveyor 12 functions as the input conveyor of the device and is thus destined to receive a flow of advancing articles A (not necessarily spaced from each other) and with a rather elevated cadence, for example, in the order of 1,000/ minute. It will be assumed hereinafter that such articles advance with an input velocity indicated with $v_{in}$.

According to a solution which is known by itself, the conveyor 12 is comprised of a belt or chain structure, only the active branch of which is shown in greater detail in the figures (in the exemplary embodiment it is the lower branch 120 with respect to an upper branch of the loop structure, not expressly visible in the drawings) that has clip formations 122 at fixed distances essentially comprising spring clips extending "backward" and overhanging in a cantilever fashion from the active branch 120 of the belt with respect to the advancing direction of the conveyor 12, thus from right to left, with reference to the point of observation in FIGS. 1 and 2, that determine the separation step of the articles A input to the device 10.

Therefore, each of the spring clip formations 122 forms a sort of retaining pocket for a corresponding article A. The articles A are inserted into the formations 122 according to known criteria (which therefore do not require detailed illustration herein), under conditions such that, when slowed down with respect to the advancing velocity $v_{in}$ imparted to them by the belt 120 of the conveyor 12, the articles A tend to slide out from the formation 122 and to fall onto the conveyor 16, representing the output conveyor of the device 10.

The conveyor 16 can be constituted by a motorised conveyor belt of which in the figures only the upper transporting branch is visible.

The conveyor 14 operates in an intermediate position between the input conveyor 12 and the output conveyor 16 with the possibility of realising the above-said slowing action on the articles A, sliding the articles A from the pockets of the conveyor 12 and causing them to fall onto the conveyor 16.

The description will specifically refer to the situation wherein the device 10 is used as a grouping device, that is, to generate an output flow of groups of superimposed articles A, each group comprising, for example, two superimposed articles, starting from a flow of articles A arriving with a given advancing velocity ($v_{in}$). As will be better seen hereinafter, the device 10 may be regulated so that the above-said groups of superimposed articles comprise three or more articles A.

The device 10 described herein is also suitable for being used to simply vary the separation step of the articles A in passing from the conveyor 12 to the conveyor 16, without providing the formation of groups of superimposed article: from this point of view the formation of groups of several articles stacked together can be seen as deriving from an extension of the action of varying the separation step between successive articles.

In the embodiment illustrated herein, the conveyor 14 is constituted by two rotating screw structures (cochleas) arranged symmetrically (more precisely mirror symmetry, also concerning the trend of the corresponding helix/threads) with respect to the longitudinal advancing direction of the articles A carried by the input conveyor 12 (on this aspect, see the frontal view in FIG. 4).

The two screws 142 are generally mounted cantilever-like and protrude towards the input extremity of the device 10 so that the articles A arriving on the input conveyor 12 are inserted axially and advance in the space comprised between the helices (or threads) of the two screws.

The screw conveyor 14 is thus adapted to receive a flow of arriving articles A longitudinally, that is, with the rotation axes of the helices 142 (axes indicated with $X_{142}$) parallel to each other and parallel to the conveying direction of the articles A on the input conveyor 12.

The pitch of the above-said helices is preferably selected so to be not less than the length of the articles A detected in the common advancing direction on the input conveyor 12 and on the screw conveyor 14. In this way, the articles A are able to advance for a certain segment inside the conveyor 14.

Those skilled in the art will appreciate also that such condition, although preferable, is not itself imperative for the purpose of actuation of the functioning mechanism better described hereinafter.

The reference numeral 144 indicates a motorisation group capable of rotating the two screws 142 in opposing directions, preserving the mirroring condition of the angular positions instantaneously taken by the portions of helix.

The rotational directions of the screws 142 are selected, to be consistent with the winding or screwing directions of the corresponding helices, so that the helices have an apparent winding movement consistent with the advancing direction of the articles A (from right to left, with reference to the observation point in FIGS. 1 and 2). In the embodiment described herein, it will be assumed that of the two screws visible in FIG. 2, the left one rotates clockwise and the right one, counter-clockwise. This said, the opposite choice is also possible.

FIG. 3 refers to some geometric parameters of a helix H considered as a geometric curve.

In particular, the represented helix H is a cylindrical helix with a main axis $X_H$, radius R and pitch p.

Assuming to rotate such helix H around its axis $X_H$ with an angular velocity $\omega_H$ and assuming to indicate with g any one of the generating lines of the ideal cylindrical surface on which the helix H lies, any point of the helix H will move along the generating g with a velocity $v_{app}$ equal to $\omega_H \times p$.

This velocity $v_{app}$ may be defined as the apparent axial screwing velocity of the helix (and of the screw with corresponding geometry) or also the conveying velocity of the screw.

The observer seeing the screw in question rotating around the axis $X_H$ in fact has the impression of seeing it advancing axially with a screwing velocity precisely equal to the above-said apparent screwing velocity $v_{app}$. At the same time, when the screw is used to convey material (for example as the screw of an extruder) the velocity $V_{app}$ in question is indeed the velocity with which the screw advances the material, conveying it in an axial direction with respect to the screw itself. The functioning of the device 10 described herein is in fact linked to the possibility of varying the rotational velocity of the screws 142 around their corresponding axes $X_{142}$, by acting on the motorisation 144, so to precisely and selectively vary the velocity $V_{app}$ with which the screws 142 themselves advance the articles A in arrival from conveyor 12.

In particular, assuming to adjust the rotational velocity of the screws 142 so that the above-said conveying velocity $v_{app}$ is equal to the velocity $v_{in}$ of the articles A in entrance, it is easy to understand that under such conditions the articles A would advance along the screws without being subjected to modifications of their advancing velocity.

On the contrary, if the rotational velocity of the screws 142 is adjusted so that the above-said conveying velocity $V_{app}$ is lower with respect to the arrival velocity $v_{in}$ of the articles A, the advancing movement of the articles A will be correspondingly slowed down, when the articles A advance axially between the two screws 142: this in fact because the helices of the screws 142 extend radially so to interfere with the advancement of the articles A (see the representation in FIG. 4). This slowing effect could be used, for example, to reduce the separation space existing between articles A so to reduce such separation step in moving from the input conveyor 12 to the output conveyor 16.

In the application illustrated herein, the above-said slowing effect is used to obtain groups of articles A in exit on the conveyor 16.

In particular, if the rotational velocity of the screws 142 is regulated so that the conveying velocity $v_{app}$ is equal to half the entrance velocity $v_{in}$, once having arrived in the space comprised between the screws 142, the articles A advance at a velocity equal to half that of their previous velocity; therefore, in a given time, when conveyed by the screws 142 they travel a distance equal to half of what they would have travelled when transported by the input conveyor 12.

Due to the effect of such slowing, the articles A "slide out" of the pockets formed by the grasping formations 122 so that they fall onto the conveyor 16 below, which is also made to advance with a velocity equal to $v_{app}$, thus equal to half of the input velocity $v_{in}$.

The effect obtained by slowing to the velocity $v_{app}$ equal to $v_{in}/2$, by the "sliding out" from the formations 122 of the conveyor 12 and by falling onto the conveyor 16 (keeping, however, the advancing velocity equal to $v_{app}$) is in fact the formation of groups of two articles A superimposed on the conveyor 16 advancing at the velocity $v_{app}$.

The above-said mechanism may be extended to the formation of groups comprising any number n of stacked articles A by reducing the angular velocity of the screws 142 so that the above said conveying velocity $v_{app}$ (that is, the velocity with which the threads or helices of the screws 142 oppose the advancing of the articles A, slowing them) is equal to a sub multiple 1/n of the velocity $v_{in}$ (that is, applying the formula $v_{in}/v_{app}=n$)

In this way, once they are received between the screws 142, the articles A, in fact, advance at a velocity that is equal to $1/n^{th}$ of the entrance velocity $v_{in}$. For a given time, the articles A advancing between the screws 142 travel a distance equal to $1/n^{th}$ the distance that they were travelling in the same unit of time, when moved by the conveyor 12.

As in the case of the formation of groups of two stacked articles A, the slowing action does not translate into a disordered overlaying of the articles A one against the other: as soon as it slides out of the corresponding formation 122, each article A falls on the conveyor 16 and can receive onto itself the article A that slides out immediately after from the formations 122 of the conveyor 12.

Those of skill in the art will appreciate that, in practice, the choice of the number n is conditioned only by maintaining the coherence of the stacks of superimposed articles A. On the other hand, the solution described herein was developed with particular attention to its possible employment for the realisation of groups of stacked article comprising a reduced number of articles (a few units, at most).

It will also be appreciated that the device 10 described herein operates according to an "online" functioning criteria, with a plurality of conveyors operating in a cascaded arrangement. This allows the device 10 to function with very elevated functional cadences, totally compatible with flows of entering articles A in the order of 1,000 articles/minute and higher.

While the present description refers to the employment of the screws 142 as a means of slowing the advancing movement of the articles A, the same mechanism allows—always playing on the rotational velocity of the screws 142, and therefore on the variation of the conveying velocity $v_{app}$ of the articles A by the screws 142—to determine an acceleration of the movement of the articles A so to produce an increase in the separating step between the articles themselves.

Furthermore, the embodiment illustrated herein refers to screws 142 having a constant pitch p. However, the solution described herein is suitable for being actuated with a non-constant pitch, for example, with a pitch that decreases starting from the entrance extremities towards the exit extremities of the screws (going from right to left, with reference to the observation point in FIG. 1 or 2). In other embodiments, instead, the pitch of the screws 142 can increase starting from the entrance extremity towards the exit extremity of the device 10 itself. In addition, while the solution described herein envisions the employment of continuous helix screws 142, the solution described herein is also suitable for being realised taking recourse to screws with helices that are constituted by distinct segments. Finally, even if the solution described herein envisions the employment of two screws 142 arranged side-by-side the basic mechanism of the solution described herein can also be actuated using only one screw.

Consequently, without prejudice to the underlying principle of the invention, the details of realisation and the embodiments may vary widely with respect to what has been described and illustrated herein, without departing from the scope of the invention as defined by the annexed claims.

What is claimed is:

1. A device for generating, from a flow of incoming articles with a given advancing velocity ($v_{in}$), an output flow of said articles comprising:
   an input conveyor;
   a screw conveyor configured to receive longitudinally said flow of incoming articles from said input conveyor, said screw conveyor including at least one screw having a helix configured to interact with said advancing articles to control the conveying of said articles by said at least one screw, a rotational velocity ($\omega$) of said at least one screw being selectively adjustable to vary a conveying velocity ($v_{app}$) of said articles by said at least one screw with respect to said given advancing velocity ($v_{in}$); and
   an output conveyor configured to receive from said screw conveyor said output flow of said articles, wherein said input conveyor has a loop structure and is provided with retaining formations configured to receive said incoming articles, said retaining formations extending from said loop structure, and wherein said at least one screw is adapted to interact with the articles conveyed by said input conveyor causing said articles to slide out of said retaining formations.

2. The device according to claim 1, wherein said at least one screw has a constant pitch.

3. The device according to claim 1, wherein said at least one screw has a pitch not less than a length of said articles in an advancing direction of said flow of incoming articles.

4. The device according to claim 1, wherein said screw conveyor includes at least one pair of said rotating screw configured to be rotatable in conditions of mirror symmetry with each other.

5. The device according to claim 4, wherein said screw conveyor is configured to convey said incoming articles in interposed positions between said at least two one pair of said rotating screws.

6. The device according to claim 1, wherein said output conveyor is movable with a velocity equal to said conveying velocity ($v_{app}$) of said articles by said at least one screw.

7. The device according to claim 1, wherein said retaining formations open in a direction opposite to an advancing direction of said articles on said input conveyor.

8. The device according to claim 1, wherein said output conveyor is located at a lower level than said screw conveyor such that said output conveyor is configured to receive said articles dropped from said screw conveyor in said output flow of said articles.

9. A device for generating, from a flow of incoming articles with a given advancing velocity ($v_{in}$), an output flow of said articles comprising:
an input conveyor;
a screw conveyor configured to receive longitudinally said flow of incoming articles from said input conveyor, said screw conveyor including at least one screw having a helix configured to interact with said advancing articles to control the conveying of said articles by said at least one screw, a rotational velocity ($\omega$) of said at least one screw being selectively adjustable to vary a conveying velocity ($v_{app}$) of said articles by said at least one screw with respect to said given advancing velocity ($v_{in}$); and
an output conveyor configured to receive from said screw conveyor said output flow of said articles, wherein said input conveyor is provided with retaining formations configured to receive said incoming articles, wherein said retaining formations open in a direction opposite to an advancing direction of said articles on said input conveyor and wherein said at least one screw is adapted to interact with the articles conveyed by said input conveyor causing said articles to slide out of said retaining formations.

10. The device according to claim 9, wherein said at least one screw has a constant pitch.

11. The device according to claim 9, wherein said at least one screw has a pitch not less than a length of said articles in an advancing direction of said flow of incoming articles.

12. The device according to claim 9, wherein said screw conveyor includes at least one pair of said rotating screw configured to be rotatable in conditions of mirror symmetry with each other.

13. The device according to claim 12, wherein said screw conveyor is configured to convey said incoming articles in interposed positions between said at least one pair of said rotating screws.

14. The device according to claim 9, wherein said output conveyor is movable with a velocity equal to said conveying velocity ($v_{app}$) of said articles by said at least one screw.

15. The device according to claim 9, wherein said input conveyor has a loop structure with said retaining formations extending from said loop structure.

16. The device according to claim 9, wherein said output conveyor is located at a lower level than said screw conveyor such that said output conveyor is configured to receive said articles dropped from said screw conveyor in said output flow of said articles.

17. A device for generating, from a flow of incoming articles with a given advancing velocity ($v_{in}$), an output flow of said articles comprising:
an input conveyor, wherein said input conveyor is provided with retaining formations configured to receive said incoming articles and wherein said input conveyor has a loop structure with said retaining formations extending from said loop structure;
a screw conveyor configured to receive longitudinally said flow of incoming articles from said input conveyor, said screw conveyor including at least one screw having a helix configured to interact with said advancing articles to control the conveying of said articles by said at least one screw, wherein said at least one screw is adapted to interact with the articles conveyed by said input conveyor causing said articles to slide out of said retaining formations, a rotational velocity ($\omega$) of said at least one screw being selectively adjustable to vary a conveying velocity ($v_{app}$) of said articles by said at least one screw with respect to said given advancing velocity ($v_{in}$), and wherein said screw conveyor includes at least one pair of said rotating screw configured to be rotatable in conditions of mirror symmetry with each other; and
an output conveyor configured to receive from said screw conveyor said output flow of said articles.

18. The device according to claim 17, wherein said at least one screw has a constant pitch.

19. The device according to claim 17, wherein said at least one screw has a pitch not less than a length of said articles in an advancing direction of said flow of incoming articles.

20. The device according to claim 17, wherein said screw conveyor is configured to convey said incoming articles in interposed positions between said at least one pair of said rotating screw.

21. The device according to claim 17, wherein said output conveyor is movable with a velocity equal to said conveying velocity ($v_{app}$) of said articles by said at least one screw.

22. The device according to claim 17, wherein said retaining formations open in a direction opposite to an advancing direction of said articles on said input conveyor.

23. The device according to claim 17, wherein said output conveyor is located at a lower level than said screw conveyor such that said output conveyor is configured to receive said articles dropped from said screw conveyor in said output flow of said articles.

* * * * *